United States Patent
Brost et al.

(10) Patent No.: US 8,016,025 B2
(45) Date of Patent: Sep. 13, 2011

(54) HEAT EXCHANGER AND METHOD OF MOUNTING

(75) Inventors: Viktor Brost, Aichtal (DE); Denis Bazika, Esslingen (DE); Manfred Kloft, Konigslutter (DE); Michael Deneke, Braunschweig (DE)

(73) Assignees: Modine Manufacturing Company, Racine, WI (US); Volkswagen AG, Wolfsburg (DE)

( * ) Notice: Subject to any disclaimer, the term of this patent is extended or adjusted under 35 U.S.C. 154(b) by 1187 days.

(21) Appl. No.: 11/594,454

(22) Filed: Nov. 8, 2006

(65) Prior Publication Data

US 2007/0175617 A1    Aug. 2, 2007

(30) Foreign Application Priority Data

Nov. 11, 2005 (DE) .......... 10 2005 053 924

(51) Int. Cl.
*F28D 1/00* (2006.01)
*F28F 3/00* (2006.01)
(52) U.S. Cl. .......... 165/149; 165/67; 165/166
(58) Field of Classification Search .......... 165/41, 165/67, 73, 75, 149, 78, 166, 167
See application file for complete search history.

(56) References Cited

U.S. PATENT DOCUMENTS

| | | | | |
|---|---|---|---|---|
| 2,178,095 A | * | 10/1939 | Bowser | 165/174 |
| 2,329,789 A | | 9/1943 | Schank et al. | |
| 2,615,687 A | * | 10/1952 | Simmons | 165/78 |
| 2,735,698 A | | 2/1956 | Brinen | |
| 2,782,009 A | | 2/1957 | Rippingille | |
| 2,819,731 A | | 1/1958 | Louthan | |
| 3,313,343 A | | 4/1967 | Ware et al. | |
| 4,303,052 A | * | 12/1981 | Manfredo et al. | 123/563 |
| 4,420,039 A | | 12/1983 | Dubrovsky | |
| 4,428,418 A | * | 1/1984 | Beasley et al. | 165/76 |
| 4,436,145 A | * | 3/1984 | Manfredo et al. | 165/67 |
| 4,474,162 A | * | 10/1984 | Mason | 123/563 |
| 4,733,722 A | * | 3/1988 | Forbes et al. | 165/159 |
| 4,823,868 A | * | 4/1989 | Neebel | 165/178 |
| 4,903,762 A | * | 2/1990 | Marsais et al. | 165/149 |
| 5,029,636 A | | 7/1991 | Kadle | |
| 5,417,280 A | | 5/1995 | Hayashi et al. | |

(Continued)

FOREIGN PATENT DOCUMENTS

DE    2903543    8/1980

(Continued)

OTHER PUBLICATIONS

PCT/US2008/051747 International Search Report and Written Opinion dated Jun. 5, 2008 (7 pages).

(Continued)

*Primary Examiner* — Tho V Duong
(74) *Attorney, Agent, or Firm* — Michael Best & Friedrich LLP

(57) ABSTRACT

The invention involves a heat exchanger in modular circuit board design, with a connecting plate, in particular a charge air cooler, which is located in a housing into which the charge air flows in and out, at which the air flows through the charge air cooler, and at which the housing has a mounting opening into which the charge air cooler can be inserted and installed by means of its connecting plate. The construction improves the absorption of oscillation and vibration, if, according to the invention, the body of the heat exchanger is equipped with mounting devices which work together with corresponding mounting devices in the interior of the housing.

19 Claims, 5 Drawing Sheets

U.S. PATENT DOCUMENTS

| | | | |
|---|---|---|---|
| 5,560,424 | A | 10/1996 | Ogawa |
| 5,625,229 | A | 4/1997 | Kojima et al. |
| 5,636,685 | A | 6/1997 | Gawve et al. |
| 5,671,806 | A | 9/1997 | Schmalzried |
| 5,685,075 | A | 11/1997 | Kato |
| 5,845,701 | A | 12/1998 | Ruppel et al. |
| 5,996,633 | A | 12/1999 | Kato |
| 6,019,169 | A | 2/2000 | Ruppel et al. |
| 6,164,370 | A | 12/2000 | Robinson et al. |
| 6,179,050 | B1 | 1/2001 | Dey et al. |
| 6,293,337 | B1 | 9/2001 | Strahle et al. |
| 6,474,408 | B1 | 11/2002 | Yeh et al. |
| 6,729,388 | B2 | 5/2004 | Emrich et al. |
| 6,904,965 | B2 | 6/2005 | Beck et al. |
| 6,920,918 | B2 | 7/2005 | Knecht et al. |
| 6,964,296 | B2 | 11/2005 | Memory et al. |
| 7,032,313 | B2 | 4/2006 | Memory et al. |
| 7,077,190 | B2 | 7/2006 | Hayashi et al. |
| 7,107,680 | B2 | 9/2006 | Ueda |
| 7,174,948 | B2 | 2/2007 | Schindler et al. |
| 7,204,302 | B2 | 4/2007 | Shibagaki et al. |
| 7,255,159 | B2 | 8/2007 | Sagasser et al. |
| 7,487,589 | B2 | 2/2009 | Smith et al. |
| 7,628,199 | B2 | 12/2009 | Rothenhofer et al. |
| 2005/0161206 | A1 | 7/2005 | Ambros et al. |
| 2008/0041556 | A1* | 2/2008 | Braun et al. ............ 165/41 |
| 2009/0194265 | A1* | 8/2009 | Nakamura ............... 165/149 |

FOREIGN PATENT DOCUMENTS

| | | | |
|---|---|---|---|
| DE | 3743293 | | 6/1989 |
| DE | 3815070 | | 11/1989 |
| DE | 4223423 | | 1/1994 |
| DE | 4307053 | | 9/1994 |
| DE | 4313505 | A1 * | 10/1994 |
| DE | 19519633 | | 12/1996 |
| DE | 69315281 | | 3/1998 |
| DE | 19644584 | | 4/1998 |
| DE | 19651625 | | 6/1998 |
| DE | 19853455 | | 6/1999 |
| DE | 19836889 | | 2/2000 |
| DE | 20003919 | | 5/2000 |
| DE | 19902004 | | 7/2000 |
| DE | 10040645 | | 6/2002 |
| DE | 10238882 | | 5/2003 |
| DE | 10242311 | | 3/2004 |
| DE | 10359806 | | 7/2005 |
| EP | 0242063 | | 10/1987 |
| EP | 0704667 | | 4/1996 |
| EP | 0974804 | | 1/2000 |
| EP | 1376043 | | 1/2004 |
| EP | 1411315 | | 4/2004 |
| EP | 1464908 | | 10/2004 |
| EP | 1522811 | | 4/2005 |
| EP | 1544564 | | 6/2005 |
| FR | 2447529 | | 8/1980 |
| FR | 2777645 | | 10/1999 |
| GB | 1129924 | | 10/1968 |
| JP | 4198692 | | 7/1992 |
| JP | 08025028 | | 1/1996 |
| JP | 2000097589 | | 4/2000 |
| JP | 2000121286 | | 4/2000 |
| JP | 2000304486 | A * | 11/2000 |
| JP | 2003106785 | | 4/2003 |
| JP | 2007003029 | | 1/2007 |
| JP | 2007-225190 | * | 9/2007 |
| RU | 2047081 | | 10/1995 |
| WO | 2004085947 | | 10/2004 |
| WO | WO 2005/001366 | | 1/2005 |
| WO | WO 2006/010463 | | 2/2006 |

OTHER PUBLICATIONS

Office Action from U.S. Appl. No. 11/015,159 dated Nov. 9, 2007 (10 pages).
Office Action from U.S. Appl. No. 11/015,159 dated Jun. 11, 2008 (11 pages).
Office Action from U.S. Appl. No. 11/015,159 dated Jan. 7, 2009 (5 pages).
Office Action from U.S. Appl. No. 11/015,159 dated May 6, 2009 (8 pages).
Office Action from U.S. Appl. No. 11/015,159 dated Nov. 24, 2009 (6 pages).
Office Action from U.S. Appl. No. 11/015,159 dated Apr. 13, 2010 (6 pages).

* cited by examiner

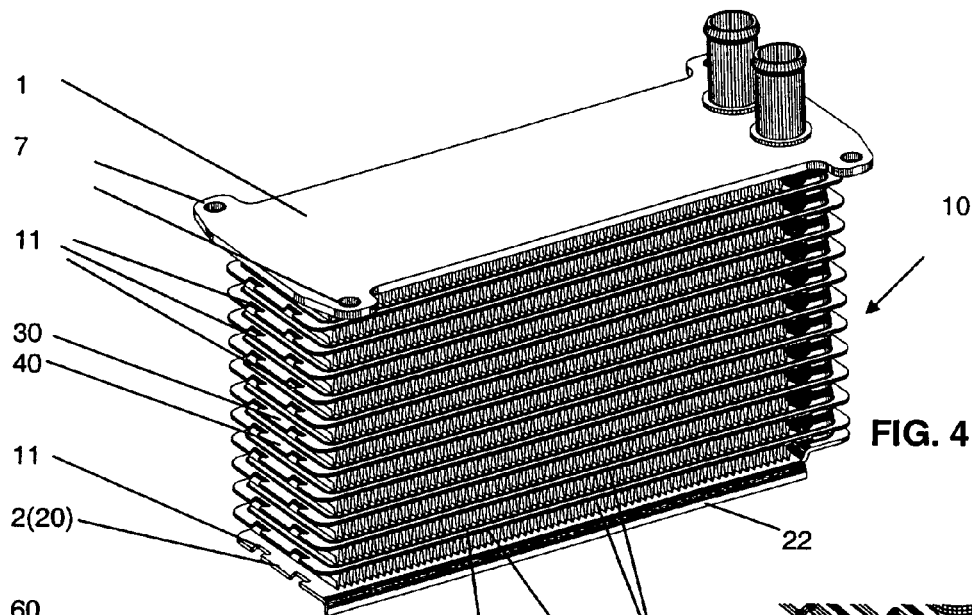
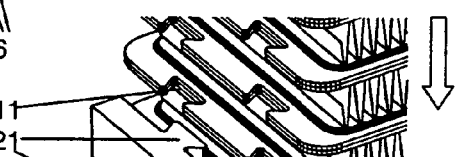
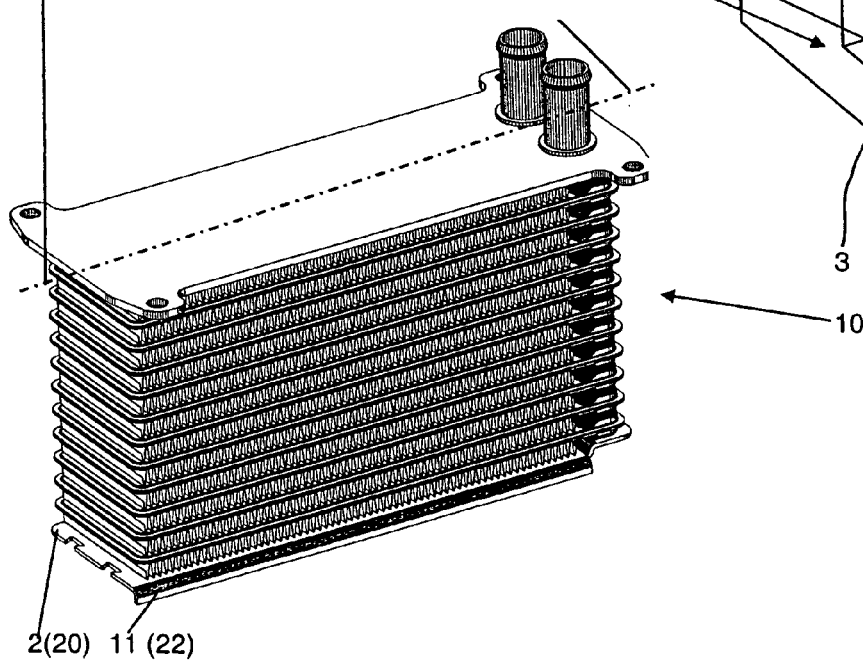

HEAT EXCHANGER AND METHOD OF MOUNTING

CROSS-REFERENCE TO RELATED APPLICATION

The present application claims priority, under 35 U.S.C. §119, to German patent Application No. DE 10 2005 053 924.6, filed Nov. 11, 2005, the contents of which are hereby incorporated by reference in their entirety.

BACKGROUND

The present invention relates to a heat exchanger, and more particularly, to a heat exchanger, such as, for example, a charge air cooler, for use with a modular board design having a connecting plate. The heat exchanger can be located in a housing into which the charge air flows. The heat exchanger can be inserted into a mounting opening in the housing and the connecting plate can be secured to the housing.

SUMMARY

German Patent No. DE 199 02 504 describes a conventional charge air cooler. The heat exchangers disclosed in German Patent Nos. DE 38 15 070 and DE 42 23 423 are used as oil coolers.

German Patent No. DE 29 03 543 C2 discloses an oil cooler housing having a mounting opening and an unattached flap, which is operable to cover the mounting opening. The oil cooler also includes two noses which can be inserted into two dome-shaped arches of the housing to hold the cooler in position in the housing.

German Patent No. DE 43 07 503 discloses a charge air cooler assembly located in a housing. The charge air cooler is assembled from heat exchanger plates and includes a connecting plate. However, the mounting characteristics of the charge air cooler are not disclosed in detail.

During motor operation, conventional oil cooling housings, particularly those that are relatively large and are designed to minimize weight, are likely to oscillate and vibrate. These problems are particularly pronounced when the housing contains a relatively heavy heat exchanger. The heat exchanger of the present invention is shaped in such way that the heat exchanger is stable and is able to resist oscillations and vibrations.

In some embodiments, the body of the heat exchanger of the present invention includes mounting devices that work together with corresponding mounting devices located in the interior of the housing.

The body of the heat exchanger can be part of a frame structure in which the plates and ribs of the heat exchanger are located.

The body of the present invention can have mounting devices that are not specifically designed for mounting purposes although they allow for mounting. For instance, elastic brackets and clamps can be located along the inner surface of the housing. These brackets and clamps can engage, for instance, behind the base plate when the heat exchanger is inserted and thus bring about an attachment.

The mounting devices of the present invention are designed to be located at the edge of the heat exchanger plates, which for this purpose have an appropriately enlarged projection. The heat exchanger is especially stabile against oscillation because the mounting devices extend across the entire body of the heat exchanger.

The mounting devices of the body are located at the edge of a baseplate, which for this purpose has an appropriate projection. This heat exchanger is especially suitable for applications having low frequency oscillations.

The plates are enclosed by a U-shaped frame and the mounting devices are designed to be located on opposite arms of the frame. Inside the housing, there are mounting devices in the form of slots and clamps which engage in the corresponding slots and clamps located on the body of the heat exchanger. In some embodiments, dovetail-shaped guides can be located inside the housing and can be engageable with corresponding dovetail shaped noses.

In some embodiments, the edge of the base plate of the heat exchanger or the edge of the frame can also be designed as a mounting device. In such embodiments, the edge of the base plate of the heat exchanger or the edge of the frame engages a notch or groove located along the inside wall of the housing.

In some embodiments, when inserting the heat exchanger into the housing, the mounting device of the body of the heat exchanger engages corresponding mounting devices located on the inside wall of the housing. This will ensure that the heat exchanger can be easily, quickly, and securely mounted in the housing and that the heat exchanger can be easily and quickly removed from the housing.

Other aspects of the invention will become apparent by consideration of the detailed description and accompanying drawings.

BRIEF DESCRIPTION OF THE DRAWINGS

FIG. 3 is a perspective view of a heat exchanger according to another embodiment of the present invention.

FIG. 4 is an enlarged perspective view of a portion of the heat exchanger shown in FIG. 3.

FIG. 5 is a perspective view of a heat exchanger according to another embodiment of the present invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
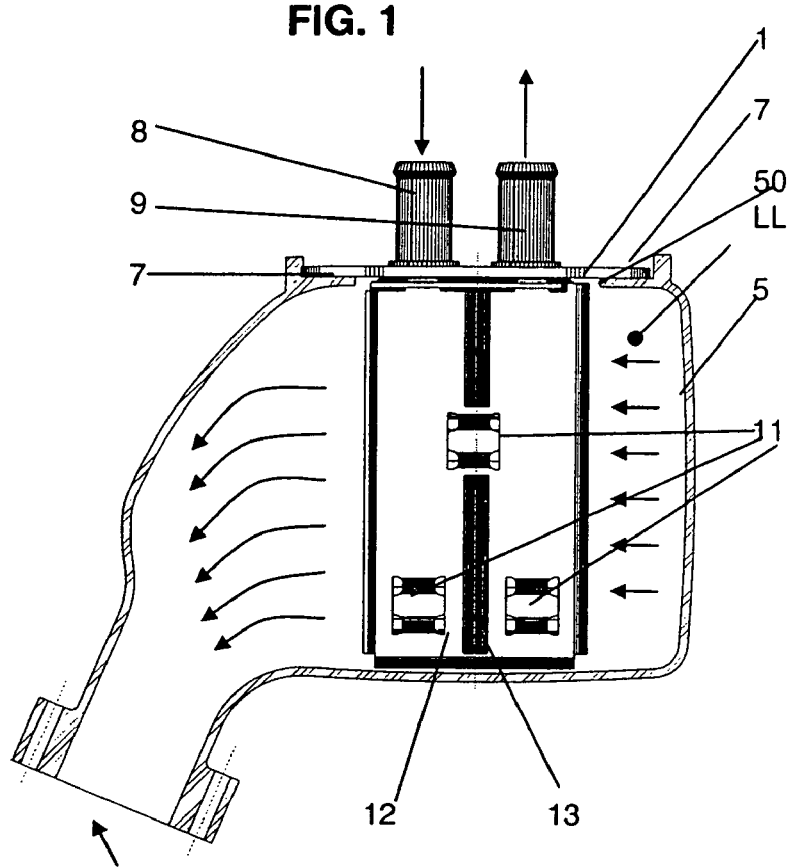
FIG. 1 is a cross-sectional view of a housing and a heat exchanger supported in the housing according to an embodiment of the present invention.
Figure 2:
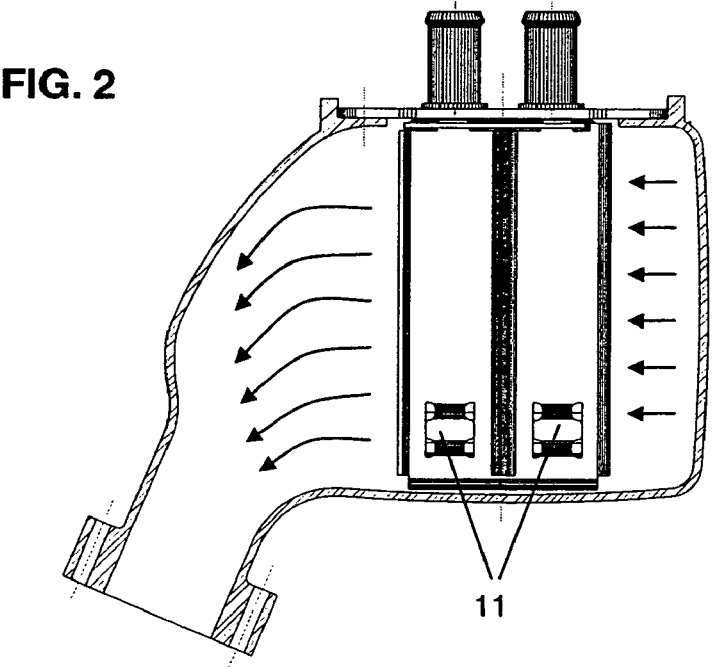
FIG. 2 is a cross-sectional view of a housing and a heat exchanger according to another embodiment of the present invention.

The heat exchanger of the present invention can be a charge air cooler assembled from plates 3, 4. In some embodiments, the charge air cooler is located, or inserted and attached, in a plastic housing 5. The housing 5 of the illustrated embodiments of FIGS. 1 and 2 is relatively voluminous, because it is an air intake connection, or an air intake passage of an internal combustion engine (not shown), through which charge air flows which has been compressed and, as a result of the compression process, heated by a compressor or turbocharger (also not shown), in order to be transported as combustion air to the cylinders of the combustion engine. The housing 5 of the illustrated embodiments of FIGS. 1 and 2 is also relatively thin-walled and not very stabile. In order to raise the degree of charge of the cylinders and, consequently, the effectiveness of the charge, the charge air is cooled by means of the charge air cooler inserted into the housing 5.

The charge air cooler includes a connecting plate 1 having corners which project laterally over the body 10 of the heat exchanger. In some embodiments, mounting openings 7 are defined in the corners of the connecting plate 1.

The body 10 of the heat exchanger includes plates 3, 4 and ribs 6, and is assembled inside the frame 12. Conduits 8, 9 for dispensing and receiving liquid coolant extend through the connecting plate 1. The frame 12 can enclose three sides of the block consisting of the plates 3, 4 and the ribs 6.

Figure 8:
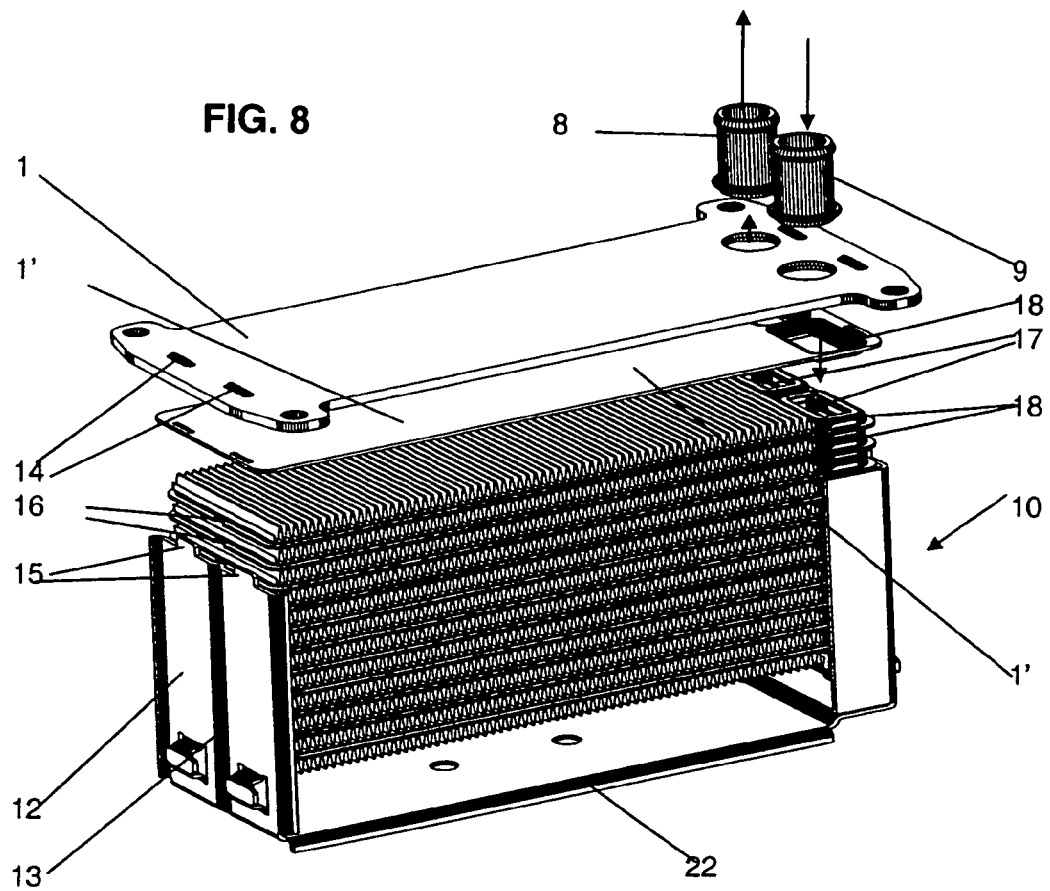
FIG. 8 is an exploded perspective view of the heat exchanger and the frame shown in FIG. 2.

As shown in FIG. 8, two protrusions or noses 15 are located at the ends of the frame arms 12 and engage slots 14 formed in the connecting plate 1. Subsequently, the noses 15 are bent in order to hold the entire body 10 of the heat exchanger together. After the noses 15 are bent, the noses 15 of the frame 12 are soldered to the connecting plate 1.

The assembled heat exchanger is then inserted into the mounting opening 50 of the housing 5. The edge of the mounting opening 50 corresponds to the shape of the connecting plate 1 and is appropriately strengthened, so that, by means of the described mounting openings 7 in the connecting plate 1, the heat exchanger can be mounted relatively securely and, at the same time, the housing 5 or mounting opening 50 can have an airtight seal.

When the heat exchanger is inserted into the mounting opening 50 of the housing 5, connectors or mounting devices 11 of the body 10 of the heat exchanger engage corresponding connectors or mounting devices 21 which are located along the inside wall of the housing 5. In this manner, the entire structure receives the necessary stability.

Figure 7:
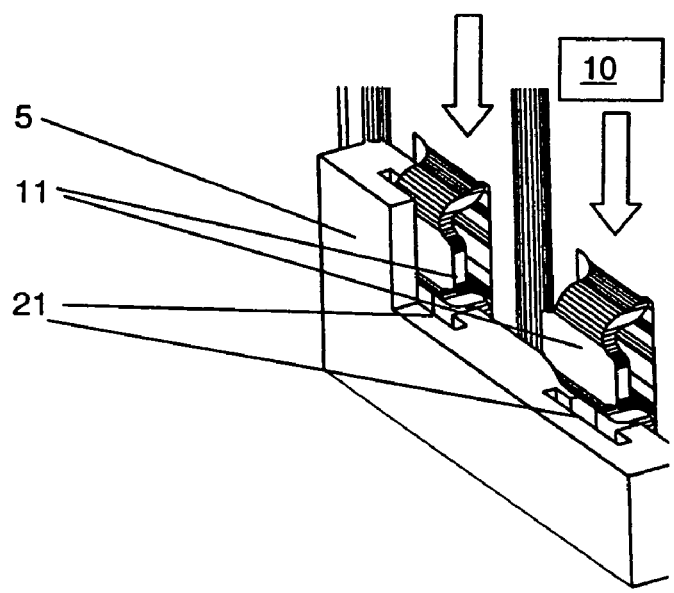
FIG. 7 is an enlarged perspective view of a portion of the heat exchanger and a portion of the frame shown in FIG. 2.

The mounting devices 11, 21 can have various shapes and configurations. For example, in the illustrated embodiment of FIG. 1, the mounting devices 11, 21 are located at three different mounting points, arranged along each of the arms of the frame 12. In contrast, in the illustrated embodiment of FIG. 2, two mounting points are arranged along each of the arms of the frame 12. Although each of FIGS. 1 and 2 show only one end the frame 12, opposite ends of the frame 12 of the embodiments shown in FIGS. 1 and 2 can also or alternatively include two or three different mounting points. In some embodiments, the mounting devices 11 are designed as clamps which engage corresponding openings 21 formed in the wall of the housing 5, as shown in FIG. 7.

Figure 6:
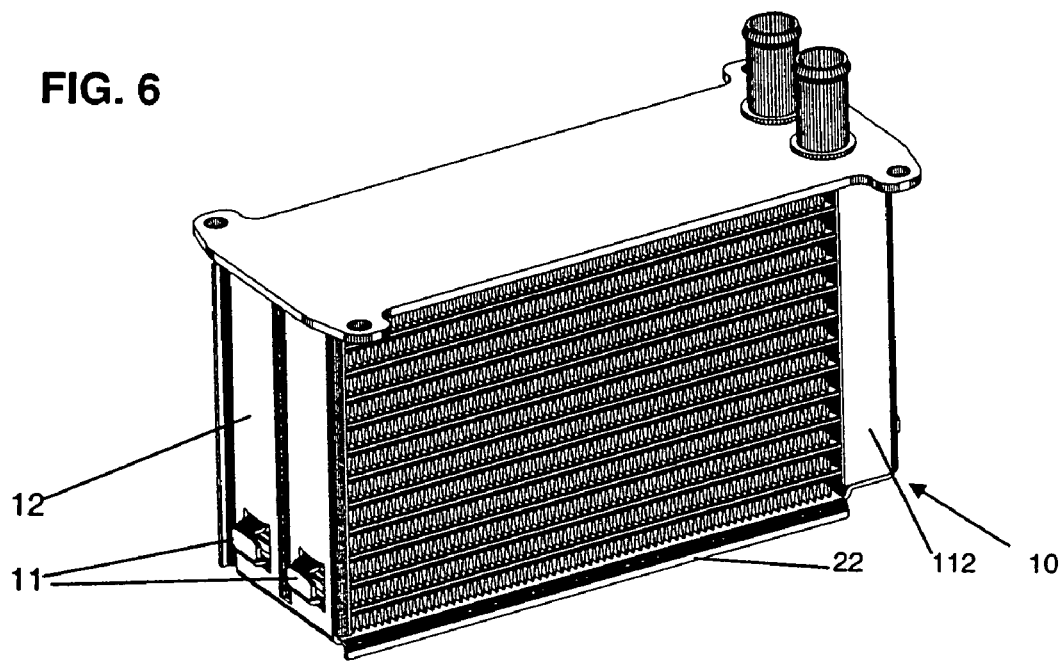
FIG. 6 is a perspective view of the heat exchanger shown in FIG. 2 supported in a frame.

FIGS. 6 and 8 show further details of the heat exchanger of the embodiment shown in FIG. 2. The illustrated embodiment of FIG. 2 includes further developments to the design of the frame 12. The arms of the frame 12 include a longitudinal bead or protrusion 13, which is shaped inwardly towards the plates 3, 4. Cut-outs or recesses 16 are formed along the edges 30, 40 of the plates 3, 4. The cut-outs 16 have a corresponding shape to the bead 13. The engagement between the cut-outs 16 and the longitudinal bead 13 serves as a mounting device 16 and simplify assembly of the plates 3, 4 and the ribs 3. In addition, the engagement between the cut-outs 16 and the longitudinal bead 13 prevents lateral movement of the plates 3, 4 and the ribs 3. This can be achieved because the bead 13 is lying in the row of cut-outs 16 and therefore prevents slipping.

As shown in the above-mentioned FIGS. 6 and 8, one arm of the frame 12 (e.g., the right arm in FIGS. 6 and 8) can be designed to direct the flow of the cooling charge air towards the center of the heat exchanger (e.g., toward the ribs 6). FIG. 8, in particular, shows that the right arm in the cross section is almost L-shaped in design. In this manner, the charge air can be prevented from bypassing an area of the heat exchanger, thereby preventing efficiency losses.

As shown in the figures, this involves the right edge area of the plates 3, 4, in which the flow openings 17 are located. Edges 18 of the flow openings 17 can be raised to form an inlet collecting area and an outflow collecting area inside the plate stack. As shown in the figures, both the inlet and outlet collecting areas pass vertically through the plate stack.

The plates 3, 4 are assembled in pairs, one of which is turned around the longitudinal axis 60 (shown in FIG. 5) by 180 degrees and is attached to the other plate in such a way that a flow area is created between the plates 3, 4. In some embodiments, the plates 3, 4 are substantially identical and each have a raised soldered edge for connecting the plates 3, 4 together. The raised shape 18 corresponds also to half of the height of the ribs 6, which are located between the plate pairs. FIG. 8 at least partially shows the raised shape described.

FIG. 8 also shows that the connecting plate 1 can include several parts. In the illustrated embodiment, the connecting plate 1 includes two plates 1, 1', which are being connected. The partial plate 1' engages the outer rib 6 and includes a raised shaping 18, which engages the shaping 18 of the adjacent plate 3, 4. In this manner, the interior pressure loss is reduced.

Fingers 35 are located along the plates 3, 4 to generate turbulence in the coolant as the coolant flows along a generally U-shaped path between the plates 3, 4. The charge air flows along a generally vertical flow path, which is generally perpendicular to the flow path of the coolant and results in an efficient heat exchange (i.e., a cross current flow).

In FIGS. 1 and 2, the flow of the charge air is shown by means of arrows. The air flows through an opening (not shown) into the housing 5 and through the ribs 6 of the heat exchanger located between the plate pairs, so that the air is cooled prior to entering the cylinders of the internal combustion engine.

Figure 9:
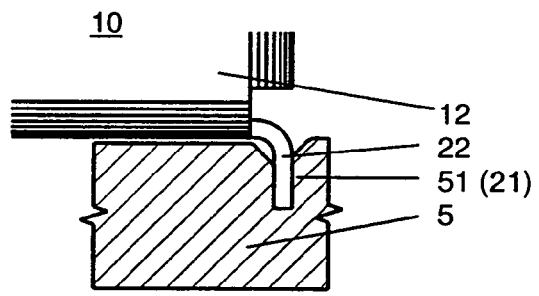
FIG. 9 is an enlarged cross-sectional view of the heat exchanger and the frame shown in FIG. 2.
Figure 10:
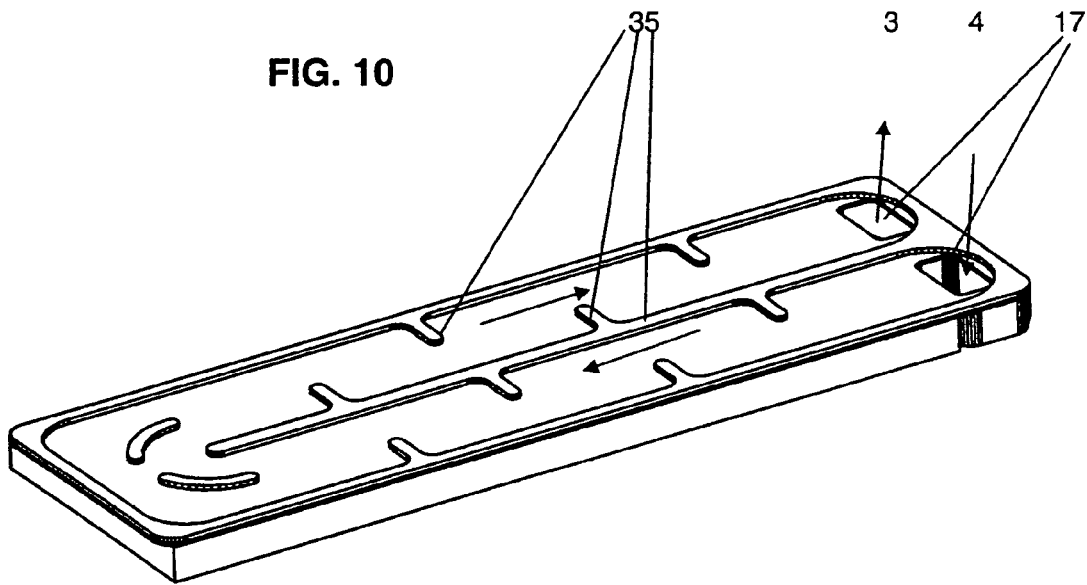
FIG. 10 is a perspective view of a plate of the heat exchanger shown in FIG. 2.

FIGS. 3 and 9 illustrate another feature for improving mounting. As shown in FIG. 9, the frame 12 can have a beveled flange 22, which engages along its entire length in a correspondingly shaped groove 51 in the wall of the housing 5. Such a flange 22 can also be located on a baseplate 2, as shown in FIG. 3 which shows an embodiment without a frame 12.

FIGS. 3 and 4 show embodiments which are especially effective in suppressing oscillation and vibration since the mounting devices 11, 21 are designed to cover the entire length of the heat exchanger and are interlocking. In these embodiments, there is no frame 12. Rather, the plates 3, 4 have an extended edges 30, 40 including integral mounting devices 11. FIG. 4 shows clearly how the mounting devices 11 of the heat exchanger interlock with the mounting devices 21 which are located in the housing 5. In these embodiments, the mounting devices 11, 21 consist of a dovetail design.

In FIG. 5, mounting devices have been designed only at the extended edge 20 of the base plate 2 of the heat exchanger.

The suggested mounting of the charge air cooler improves the absorption of oscillation and vibration. Consequently, despite the presence of a heat exchanger, the inside of the housing 5 itself can be designed relatively easy and thin-walled and without significant infiltration in the walls.

Various features and advantages of the invention are set forth in the following claims.

What is claimed is:

1. A heat exchanger comprising a plurality of heat exchanger plates and a connecting plate, the heat exchanger having a body and being a charge air cooler, which is located in a housing through which charge air flows, the housing defining a mounting opening through which the charge air cooler is received, the connecting plate being secured to the body, the body of the heat exchanger including connectors that engage corresponding connectors located in an interior of the housing wherein the heat exchanger plates are enclosed by a frame, wherein the connectors of the body are located on the frame wherein the frame is generally U-shaped and, wherein the connectors are located on opposite arms of the frame, wherein the connectors of the body extend outwardly from the arms of the frame away from the heat exchanger plates, wherein the connectors of the housing include corresponding openings, and wherein the connectors of the body are received in the corresponding openings to secure the body of the heat exchanger to the housing.

2. The heat exchanger of claim 1, wherein the arms of the frame have protrusions which engage in slots of the connecting plate, and wherein the arms and edges of the heat exchanger plates have positioning devices.

3. The heat exchanger of claim 1, wherein the connectors of the body of the heat exchanger include clamps which engage in the corresponding openings to secure the body of the heat exchanger to the housing.

4. The heat exchanger of claim 1, wherein the openings are located on an inside wall of the housing, wherein, when inserting the heat exchanger into the housing, the connectors of the body of the heat exchanger engage the corresponding openings of the inside wall of the housing to removably secure the heat exchanger body in the housing.

5. The heat exchanger of claim 1, wherein the connecting plate includes a first plate connected to a second plate.

6. The heat exchanger of claim 1, wherein the housing is formed from plastic.

7. The heat exchanger of claim 1, wherein the connecting plate extends laterally past the heat exchanger plates.

8. The heat exchanger of claim 1, further comprising a first conduit for receiving cooling fluid into the heat exchanger and a second conduit for dispensing cooling fluid from the heat exchanger, wherein the first conduit and the second conduit extend through the connecting plate.

9. The heat exchanger of claim 1, wherein the arms of the frame each include a longitudinal bead shaped inwardly toward the heat exchanger plates, wherein the plates include recesses formed along edges of the heat exchanger plates, and wherein the longitudinal beads are received within the recesses.

10. The heat exchanger of claim 1, wherein the heat exchanger plates are assembled in pairs.

11. The heat exchanger of claim 10, wherein each pair of heat exchanger plates includes a flow opening to allow cooling fluid to flow between the pair of heat exchanger plates.

12. The heat exchanger of claim 11, further comprising raised edges that extend around the flow openings to form inlet collecting areas for the pairs of heat exchanger plates.

13. The heat exchanger of claim 11, wherein the heat exchanger plates each include fingers that are located along the plates to generate turbulence in the cooling fluid as it flows between a pair of heat exchanger plates.

14. The heat exchanger of claim 10, wherein the heat exchanger plates are substantially identical.

15. The heat exchanger of claim 1, wherein the charge air flow is generally perpendicular to a flow path of the coolant.

16. The heat exchanger of claim 1, further comprising ribs between adjacent heat exchanger plates, and wherein the charge air flows through the ribs.

17. The heat exchanger of claim 1, wherein the frame includes a base plate and the arms extend from the base plate, wherein the base plate includes a flange that extends along a length of the base plate, and wherein the housing includes a groove that receives the flange of the base plate to secure the body of the heat exchanger to the housing.

18. The heat exchanger of claim 17, wherein the flange extends from the base plate in a direction away from the heat exchanger plates.

19. The heat exchanger of claim 17, wherein the flange extends along substantially the entire length of the base plate.

* * * * *